(12) United States Patent
Guggisberg et al.

(10) Patent No.: US 7,547,982 B2
(45) Date of Patent: Jun. 16, 2009

(54) DEVICE FOR THE FEEDING OF AUXILIARY OPERATING FACILITIES FOR A FUEL-ELECTRICALLY DRIVEN VEHICLE

(75) Inventors: Beat Guggisberg, Untersiggenthal (CH); Vishal Bisen, Turgi (CH)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 11/709,842

(22) Filed: Feb. 23, 2007

(65) Prior Publication Data

US 2007/0170780 A1 Jul. 26, 2007

Related U.S. Application Data

(63) Continuation of application No. PCT/CH2005/000485, filed on Aug. 19, 2005.

(30) Foreign Application Priority Data

Aug. 26, 2004 (EP) .................................. 04405531

(51) Int. Cl.
F02D 29/06 (2006.01)
(52) U.S. Cl. ..................................... 290/40 F
(58) Field of Classification Search ................. 290/40 F
See application file for complete search history.

(56) References Cited

U.S. PATENT DOCUMENTS 4,047,088 A * 9/1977 Himmler ..................... 320/123

(Continued)

FOREIGN PATENT DOCUMENTS

DE 40 17 670 A1 12/1991

(Continued)

OTHER PUBLICATIONS

International Search Report dated Nov. 3, 2005 (with English translation of category of cited documents).

(Continued)

*Primary Examiner*—Nicholas Ponomarenko
*Assistant Examiner*—Pedro J Cuevas
(74) *Attorney, Agent, or Firm*—Buchanan Ingersoll & Rooney PC

(57) ABSTRACT

A device for the feeding of auxiliary operating facilities for a fuel-electrically driven vehicle with a combustion engine is stated, which device comprises a generator driven by the combustion engine and a rectifier connected with a generator on the AC voltage side, wherein the rectifier on the DC voltage side is connected with a first and a second connection of a DC voltage circuit. Alternatively, first and second rectifiers connected with the generator on the AC voltage side can be provided, wherein the first rectifier is connected on the DC voltage side with a first and a second connection of a first DC voltage circuit and the second rectifier on the DC voltage side with a first and a second connection of a second DC voltage circuit. Saving of the space requirement and increase of the robustness and the susceptibility to faults is achieved in that a first and a second step-down converter each is connected with the first and second connection of the DC voltage circuit, and that the first and second step-down converter is connected with a common DC voltage rail system for the feeding of the auxiliary operating facilities. As an alternative to the second step-down converter a further-rectifier connected with the generator on the AC voltage side can also be provided wherein the first step-down converter and the further rectifier are then connected with the common DC voltage rail system for the feeding of the auxiliary operating facilities.

28 Claims, 10 Drawing Sheets

U.S. PATENT DOCUMENTS

| | | | | |
|---|---|---|---|---|
| 4,604,528 | A * | 8/1986 | Norton | 307/9.1 |
| 4,678,982 | A * | 7/1987 | Offiler et al. | 322/81 |
| 4,694,238 | A * | 9/1987 | Norton | 322/28 |
| 4,780,619 | A * | 10/1988 | Campbell et al. | 307/10.1 |
| 4,967,096 | A * | 10/1990 | Diemer et al. | 307/19 |
| 4,985,671 | A * | 1/1991 | Sauer | 323/282 |
| 4,992,672 | A * | 2/1991 | Norton | 307/10.1 |
| 5,166,538 | A * | 11/1992 | Norton | 307/10.1 |
| 5,187,350 | A * | 2/1993 | Tsuchiya | 219/203 |
| 5,483,146 | A * | 1/1996 | Schultz et al. | 322/7 |
| 5,483,152 | A * | 1/1996 | Hardee et al. | 323/314 |
| 5,735,215 | A * | 4/1998 | Tegeler | 105/34.1 |
| 6,037,752 | A * | 3/2000 | Glennon | 322/22 |
| 6,087,791 | A | 7/2000 | Maruyama | |
| 6,144,567 | A * | 11/2000 | Asplund et al. | 363/37 |
| 6,243,277 | B1 * | 6/2001 | Sun et al. | 363/65 |
| 6,300,746 | B1 * | 10/2001 | Mueller et al. | 322/29 |
| 6,487,096 | B1 * | 11/2002 | Gilbreth et al. | 363/35 |
| 6,778,414 | B2 * | 8/2004 | Chang et al. | 363/67 |
| 6,784,565 | B2 * | 8/2004 | Wall et al. | 290/52 |
| 6,787,933 | B2 * | 9/2004 | Claude et al. | 290/52 |
| 6,788,027 | B2 * | 9/2004 | Malik | 320/134 |
| 6,870,279 | B2 * | 3/2005 | Gilbreth et al. | 290/52 |
| 6,894,455 | B2 * | 5/2005 | Cai et al. | 318/771 |
| 6,919,711 | B2 * | 7/2005 | Haydock et al. | 322/24 |
| 6,933,627 | B2 * | 8/2005 | Wilhelm | 307/66 |
| 7,084,588 | B2 * | 8/2006 | Hampo et al. | 318/139 |
| 7,392,143 | B2 * | 6/2008 | Jayabalan et al. | 702/60 |
| 7,447,050 | B2 * | 11/2008 | Stefanutti et al. | 363/65 |
| 2002/0140405 | A1 * | 10/2002 | Malik | 320/166 |
| 2004/0119454 | A1 * | 6/2004 | Chang et al. | 323/284 |
| 2004/0217723 | A1 * | 11/2004 | Cai et al. | 318/268 |
| 2005/0225090 | A1 * | 10/2005 | Wobben | 290/44 |
| 2006/0022625 | A1 * | 2/2006 | Hampo et al. | 318/432 |
| 2006/0151219 | A1 * | 7/2006 | Khan et al. | 180/65.1 |
| 2006/0170218 | A1 * | 8/2006 | Grant et al. | 290/1 R |
| 2007/0138982 | A1 * | 6/2007 | Guggisberg et al. | 318/140 |
| 2007/0219749 | A1 * | 9/2007 | Jayabalan et al. | 702/182 |
| 2007/0236969 | A1 * | 10/2007 | Cottingham, III | 363/39 |
| 2007/0241725 | A1 * | 10/2007 | Ryu et al. | 323/222 |
| 2008/0278969 | A1 * | 11/2008 | Bolz et al. | 363/17 |
| 2009/0027930 | A1 * | 1/2009 | Usui | 363/84 |
| 2009/0027931 | A1 * | 1/2009 | Usui | 363/84 |
| 2009/0034304 | A1 * | 2/2009 | Engel et al. | 363/71 |

FOREIGN PATENT DOCUMENTS

| | | |
|---|---|---|
| DE | 94 13 638 U1 | 2/1996 |
| DE | 196 38 620 A1 | 4/1998 |
| DE | 198 48 728 A1 | 4/2000 |
| DE | 200 01 113 U1 | 5/2000 |
| EP | 1 127 732 A2 | 8/2001 |
| JP | 05022858 A * | 1/1993 |
| WO | 96/10508 A1 | 4/1996 |

OTHER PUBLICATIONS

Written Opinion of the International Searching Authority.
International Preliminary Report on Patentability dated Oct. 17, 2006.
European Search Report dated Feb. 1, 2005 (with English translation of category of cited documents).
English translation of Form PCT/IPEA/409 (International Preliminary Report on Patentability).

* cited by examiner

DEVICE FOR THE FEEDING OF AUXILIARY OPERATING FACILITIES FOR A FUEL-ELECTRICALLY DRIVEN VEHICLE

RELATED APPLICATIONS

This application is based on and claims priority under 35 U.S.C. §119 to European Application No. 04405531.7, filed Aug. 26, 2004 and is a continuation application under 35 U.S.C. §120 of International Application No. PCT/CH2005/000485, filed Aug. 19, 2005 designating the U.S., the entire contents of both of which are hereby incorporated by reference.

TECHNICAL FIELD

The disclosure relates to the area of auxiliary operating facilities for fuel-electrically driven vehicles, and is based on a device for the feeding of auxiliary operating facilities for a fuel-electrically driven vehicle.

BACKGROUND INFORMATION

Today, auxiliary operating facilities for fuel-electrically driven vehicles are mainly employed in diesel-electric locomotives or large diesel-electric mine vehicles, where the auxiliary operating facilities are constructed as fans, air-conditioning systems, actuators, on-board network converters etc. Such auxiliary operating facilities are popularly fed by means of a suitable device. Such a device for the feeding of auxiliary operating facilities for a fuel-electrically driven vehicle is for example mentioned in the U.S. Pat. No. 6,087,791 and in the DE 200 01 113 U1. In it the device has a combustion engine, a generator driven by the combustion engine and a rectifier connected with the generator on the AC voltage side. On the DC voltage side the rectifier is connected with a first and a second connection of a DC voltage circuit. In addition, with the device according to DE 200 01 113 U1, a multiplicity of inverters is connected to the first and second connection of the DC voltage circuit, which inverters each supply the relevant auxiliary operating facility such as for example fan, air-conditioning system, actuator, on-board network converter etc. with electric energy. According to the U.S. Pat. No. 6,087,791 and the DE 200 01 113 U1 a drive inverter is also connected to the first and second connection of the DC voltage circuit, which drive inverter on the AC voltage side feeds one or several drive motors of the vehicle.

It is also conceivable that a second rectifier connected with a generator is provided. The second rectifier is then connected on the DC voltage side with a first and a second connection of a second DC voltage circuit, while a second drive inverter is connected to the first and second connection of the second DC voltage circuit, which second drive inverter on the AC voltage side feeds one or several drive motors of the vehicle.

Since the power requirement of such drive motors is very high, a DC voltage of several kilovolts is typically present between the first and the second connection of the DC voltage circuit in order to be able to provide the appropriate power. Problematic in this context with the device for the feeding of auxiliary operating facilities for a fuel-electrically driven vehicle of the U.S. Pat. No. 6,087,791 and the DE 200 01 113 U1 is that the inverters connected to the first and second connection of the DC voltage circuit have to be designed to the high DC voltage mentioned above, e.g., the power semiconductor switches of the respective inverters have to have a high blocking capability and suitable protective facilities and operating methods specifically adapted to these. The construction of the inverters is thus highly complicated, susceptible to faults and accordingly requires a lot of space. In addition, insulation distances of the supply lines and rails to the inverters and between the inverters themselves have to be maintained, which requires additional space. This complicated and space-intensive construction of the inverters and the device for the feeding of auxiliary operating facilities consequently causes major expenditure in terms of installation and maintenance. Especially a simple, compact and robust construction of the device for the feeding of auxiliary operating facilities however is extremely desirable with a fuel-electrically driven vehicle.

In the DE 94 13 638 U1 a device for the feeding of auxiliary operating facilities for a fuel-electrically driven vehicle is also disclosed, which device has a first combustion engine and a first generator driven by the first combustion engine. On the AC voltage side with the first generator, a first rectifier assigned to the first generator is connected, wherein a first step-down converter is connected downstream of the first rectifier. An assigned first DC voltage circuit is connected downstream of the first step-down converter with which first DC voltage circuit a first inverter for the feeding of auxiliary operating facilities is connected. In addition to this, the device of the DE 94 13 638 U1 has a second combustion engine and a second generator driven by the second combustion engine. On the AC voltage side a second rectifier assigned to the second generator is connected to the second generator while a second step-down converter is connected downstream of the second rectifier. An assigned second DC voltage circuit is connected downstream of the second step-down converter with which second DC voltage circuit a second inverter for the feeding of auxiliary operating facilities is connected.

SUMMARY

A device is disclosed for the feeding of auxiliary operating facilities for a fuel-electrically driven vehicle which has low space requirements and is additionally sturdy and not susceptible to faults.

An exemplary device for the feeding of auxiliary operating facilities for a fuel-electrically driven vehicle comprises a combustion engine, a generator driven by the combustion engine, and a rectifier connected with the generator on the AC voltage side and assigned to the generator, wherein the rectifier on the DC voltage side is connected to a first and a second connection of a DC voltage circuit assigned to the rectifier and connected downstream of the rectifier. A first and a second step-down converter is provided, wherein the first and second step-down converter each is connected to the first and second connection of the DC voltage circuit and the first and second step-down converter is further connected to a common DC voltage rail system for the feeding of the auxiliary operating facilities connected downstream of the first and second step-down converter. Inverters of the auxiliary operating facilities and/or DC voltage converters of the auxiliary operating facilities can be connected to the common DC voltage rail system for their feeding.

Through the two step-down converters the voltage on the DC voltage rail system can be set with advantage. This setting is performed such that the voltage on the DC voltage rail system is lower than the voltage between the first and second connection of the DC voltage circuit. By means of the voltage of the DC voltage rail system which is lower compared with the DC voltage circuit the insulation distance of the DC voltage rail system, e.g., of the rail system legs of the DC voltage rail system can be reduced so that space can be saved with advantage and the installation and maintenance expenditure kept low in addition. Furthermore a redundant feed of the DC voltage rail system is possible through the two step-down converters connected to the common DC voltage rail system, e.g., in the event of a fault or a failure of a step-down converter, feeding of the DC voltage rail system can be carried out by way of the other step-down converter so that the auxiliary operating facilities can continue to be fed via their inverters and/or DC voltage converters. As a result, the exemplary device can be highly robust, not susceptible to faults and characterized by high availability.

By means of the voltage of the DC voltage rail system which is lower in comparison with the DC voltage circuit the inverters and/or DC voltage converters of the auxiliary operating facility, e.g., the power semiconductor switches of the inverters and/or DC voltage converters with corresponding protective facilities and operating methods for example need not be designed to the high voltage of the DC voltage circuit, but merely to the lower voltage of the DC voltage rail system. Advantageously the construction of the inverters and/or DC voltage converters can be simplified as a result, the inverters and/or DC voltage converters are less susceptible to faults and require correspondingly less space. In addition, the simple and space-saving construction of the inverters and/or DC voltage converters causes less installation and maintenance expenditure.

As an alternative to the second step-down converter a further rectifier connected with the generator on the AC voltage side and assigned to the generator can be provided wherein the first step-down converter and the further rectifier can be connected with a common DC voltage rail system connected downstream of the first step-down converter and the further rectifier for the feeding of the auxiliary operating facilities.

Through the first step-down converter and the further rectifier the voltage on the DC voltage rail system can likewise be set with advantage as has already been explained with the solution with two step-down converters. By means of the voltage of the DC voltage rail system achieved which is lower in comparison with the DC voltage circuit, the insulation distance of the DC voltage rail system, e.g., the rail system legs of the DC voltage rail system can be reduced so that with advantage space can be saved and the installation and maintenance expenditure kept low in addition. In addition, redundant feeding of the DC voltage rail system is possible through the first step-down converter and the further rectifier, both of which can be connected with the common DC voltage rail system, e.g., during a fault or a failure for example of the step-down converter, feeding of the DC voltage rail system is carried out via the rectifier so that the auxiliary operating facilities can continue to be fed via their inverters and/or DC voltage converters. The exemplary device can thus be very robust, not susceptible to faults and characterized by high availability.

With the alternative solution with the first step-down converter and the further rectifier, too, the inverters and/or DC voltage converters of the auxiliary operating facilities for instance need not be designed for the high voltage of the DC voltage circuit because of the voltage of the DC voltage rail system, which is lower in comparison with the DC voltage circuit, but merely for the lower voltage of the DC voltage rail system. Advantageously, the construction of the inverters and/or DC voltage converters can be simplified as a result, the inverters and/or DC voltage converters are less susceptible to faults and require correspondingly less space. In addition, the simple and space-saving construction of the inverters and/or DC voltage converters causes less installation and maintenance expenditure.

As a further alternative exemplary device for the feeding of auxiliary operating facilities for a fuel-electrically driven vehicle can comprise a combustion engine, a generator driven by the combustion engine and first and second rectifiers connected with the generator on the AC voltage side and assigned to the generator, wherein the first rectifier is connected on the DC voltage side with a first and a second connection of a first DC voltage circuit assigned to the first rectifier and connected downstream of the first rectifier and the second rectifier on the DC voltage side with a first and a second connection of a second DC voltage circuit assigned to the second rectifier and connected downstream of the second rectifier. A first and a second step-down converter can then be provided wherein the first step-down converter is connected with the first and second connection of the first DC voltage circuit and the second step-down converter with the first and second connection of the second DC voltage circuit and the first and second step-down converter continues to be connected with a common DC voltage rail system for the feeding of the auxiliary operating facilities connected downstream of the first and second step-down converter. Inverters of the auxiliary operating facilities and/or DC voltage converters of the auxiliary operating facilities are then also connected to the common DC voltage rail system for their feeding. The advantages mentioned above also apply to this alternative solution.

BRIEF DESCRIPTION OF THE DRAWINGS

These and further objects, advantages and characteristics of the various exemplary embodiments become obvious from the following detailed description of various exemplary embodiments in connection with the drawing.

It shows.

Figure 1:
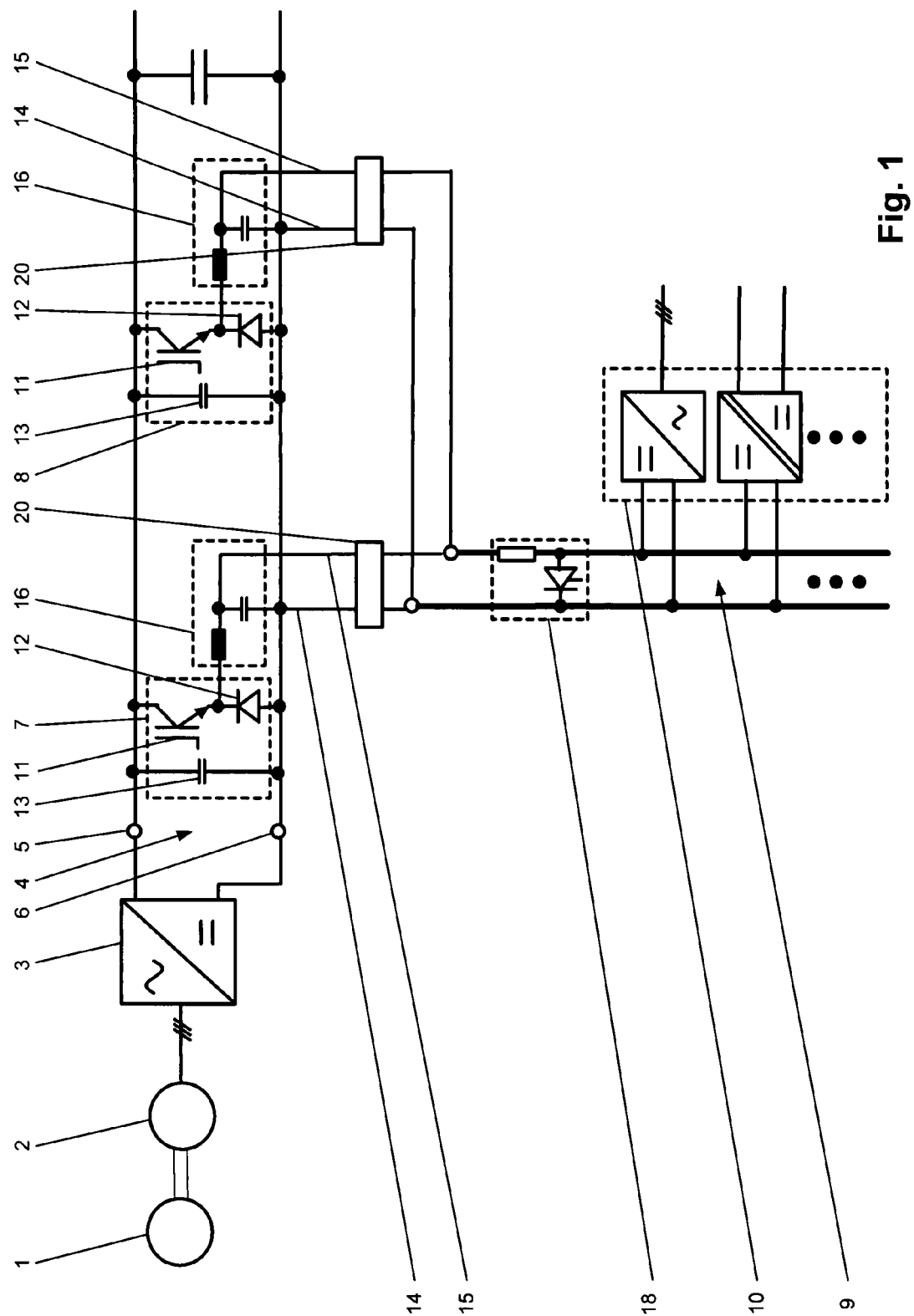
FIG. 1 a first exemplary embodiment of a device for the feeding of auxiliary operating facilities for a fuel-electrically driven vehicle, FIG. 2 a second exemplary embodiment of the device,
FIG. 3 a third exemplary embodiment of the device,
FIG. 4 a fourth exemplary embodiment of the device,
FIG. 5 a fifth exemplary embodiment of the device,
FIG. 6 a sixth exemplary embodiment of the device,
FIG. 7 a seventh exemplary embodiment of the device,
FIG. 8 an eighth exemplary embodiment of the device,
FIG. 9 a ninth exemplary embodiment of the device and
FIG. 10 a tenth exemplary embodiment of the device.

The reference numbers used in the drawing and their meaning are listed in summary in the list of reference numbers. As a matter of principle, identical parts are provided with identical reference numbers in the Figures. The described embodiments stand as examples for the disclosed subject matter and have no restrictive effect.

DETAILED DESCRIPTION

In FIG. 1, a first exemplary embodiment of the device for the feeding of auxiliary operating facility for a fuel-electrically driven vehicle is shown. The exemplary device according to FIG. 1 comprises a combustion engine 1, a generator 2 driven by the combustion engine 1 and a rectifier 3 connected on the AC voltage side with the generator 2 and assigned to the generator 2, wherein the rectifier 3 on the DC voltage side is connected with a first and second connection 5, 6 of a DC voltage circuit 4 assigned to the rectifier 3 and connected downstream of the rectifier 3. A first and a second step-down converter 7, 8 is provided, wherein each the first and the second step-down converter 7, 8 is connected with the first and second connection 5, 6 of the DC voltage circuit 4. According to FIG. 1 the DC voltage circuit 4 with regard to the first and second step-down converter 7, 8 can comprise a common DC voltage circuit 4, wherein the first and second step-down converter 7, 8 can be connected downstream of the DC voltage circuit 4. In addition, the first and second step-down converter 7, 8 is connected with a common DC voltage rail system 9 for the feeding of auxiliary operating facilities 10 connected downstream of the first and second step-down converter 7, 8. According to FIG. 1, inverters of the auxiliary operating facilities 10 and/or DC voltage converters of the auxiliary operating facilities 10 are connected to the common DC voltage rail system 9 for their feeding.

Through the two step-down converters 7, 8 the voltage can be set on the DC voltage rail system 9 with advantage. This setting is carried out such that the voltage on the DC voltage rail system 9 is lower than the voltage between the first and second connection 5, 6 of the DC voltage circuit 4. Through the voltage of the DC voltage rail system 9 which is lower in comparison with the DC voltage circuit 4 the insulation distance of the rail system legs of the DC voltage rail system 9 can be reduced so that advantageously space can be saved and additionally the installation and maintenance expenditure kept low or minimized. Furthermore, redundant feeding of the DC voltage rail system 9 is possible through the two step-down converters 7, 8 connected with the common DC voltage rail system 9. This means that in the event of a fault or a failure for example of the first step-down converter 7 the feed of the DC voltage rail system 9 is performed via the second step-down converter 8 so that the auxiliary operating facilities 10 can continue to be fed by way of their inverters and/or DC voltage converters. The exemplary device is thus highly robust, not susceptible to faults and characterized by high availability.

According to FIG. 1 the respective step-down converter 7, 8 is formed through a series circuit of a controllable power semiconductor switch 11 with a diode 12 and through a capacity 13 connected in parallel with the series circuit of the controllable power semiconductor switch 11 with the diode 12. According to FIG. 1 the controllable power semiconductor switch 11 is designed as bipolar transistor with gate electrode arranged in an insulated manner (IGBT). However the controllable power semiconductor switch can be configured as power MOSFET, as turn-off thyristor (GTO—Gate Turn-Off Thyristor) or as integrated thyristor with commutated gate electrode (IGCT—Integrated Gate Commutated Thyristor). According to FIG. 1, the controllable power semiconductor switch 11 with the respective step-down converter 7, 8 is additionally connected with the first connection 5 of the DC voltage circuit 4 and the diode 12 with the second connection 6 of the DC voltage circuit 4. In addition, with the respective step-down converter 7, 8, the diode 12 is connected through a first connection 14 and the connection point of the diode 12 with the controllable power semiconductor switch 11 through a second connection 15 with the common DC voltage rail system 9. The respective step-down converter 7, 8 consequently manages with a minimum number of components and can thus be realized very easily and space-savingly. Through the low number of components the first and second step-down converter 7, 8 are particularly robust and not susceptible to faults and therefore have a high availability.

According to FIG. 1 with the respective step-down converter 7, 8 a filter circuit 16 is additionally connected between the first connection 14, 15 and the common DC voltage rail system 9 and to the second connection 15. The filter circuit 16 advantageously results in that undesirable voltage fluctuations and current fluctuations created through switching actions of the respective step-down converter 7, 8 are filtered out so that the voltage of the DC voltage rail system 9, e.g., the voltage present between the rail system legs, is nearly a DC voltage.

Figure 2:
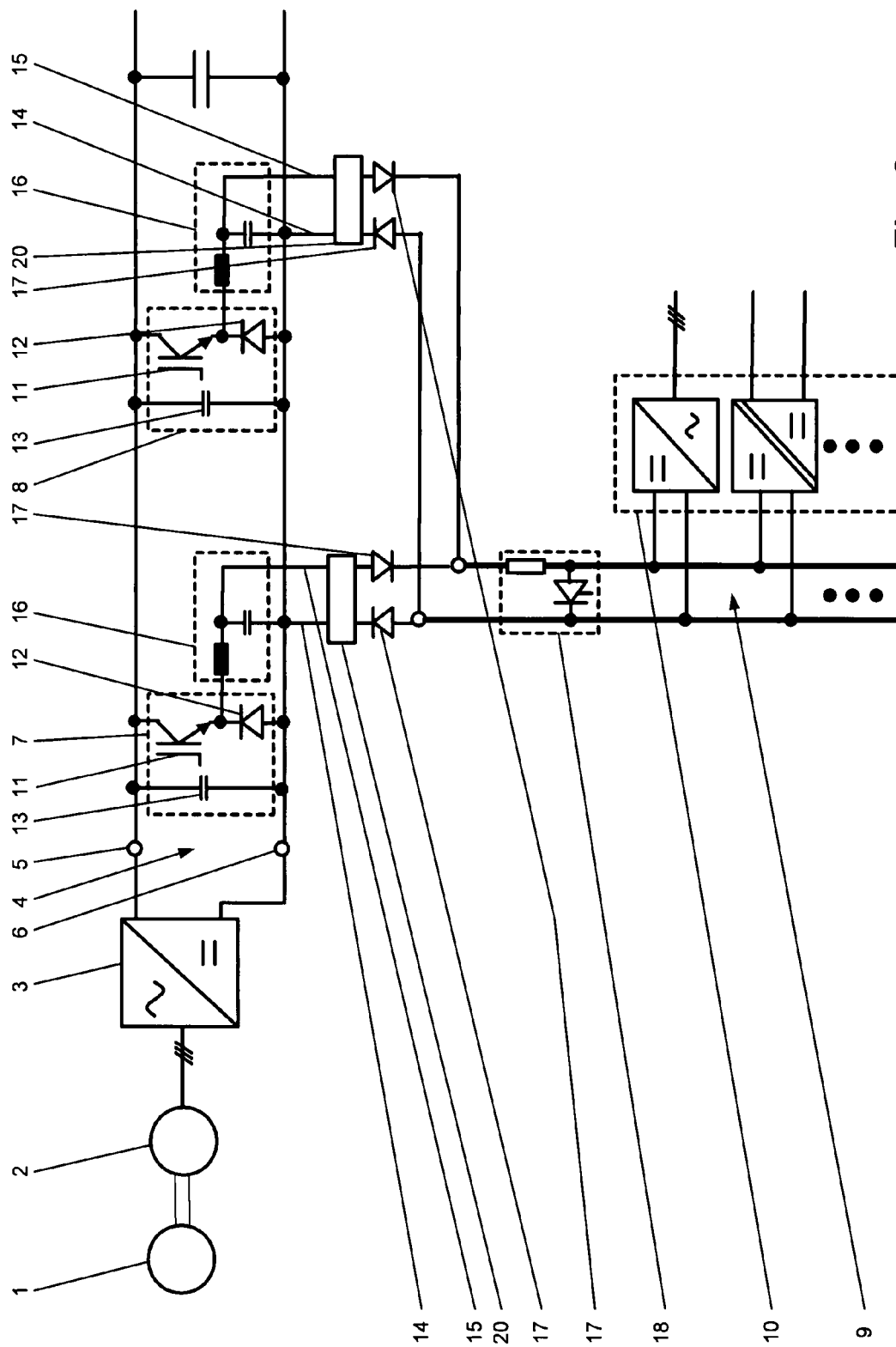

In contrast with the first exemplary embodiment according to FIG. 1, a current direction limitation element 17 each can be connected with the respective step-down converter 7, 8 in the first connection 14 and in the second connection 15 in a second exemplary embodiment of the device according to FIG. 2. The respective current direction limitation element 17 serves to ensure that only a current in defined current direction flows from the respective step-down converter 7, 8 to the DC voltage rail system 9 and, in a defined manner, back again. As a result, it is advantageously avoided that a fault current, for example caused through faults of the DC voltage rail system 9 and/or a fault in one or in several auxiliary operating facilities 10 can flow back to the respective step-down converter 7, 8 and damage or even destroy the respective step-down converter 7, 8. The respective current direction limitation element 17 according to FIG. 2 can be configured as a diode and can thus be advantageously realized very easily and space-savingly.

Figure 3:
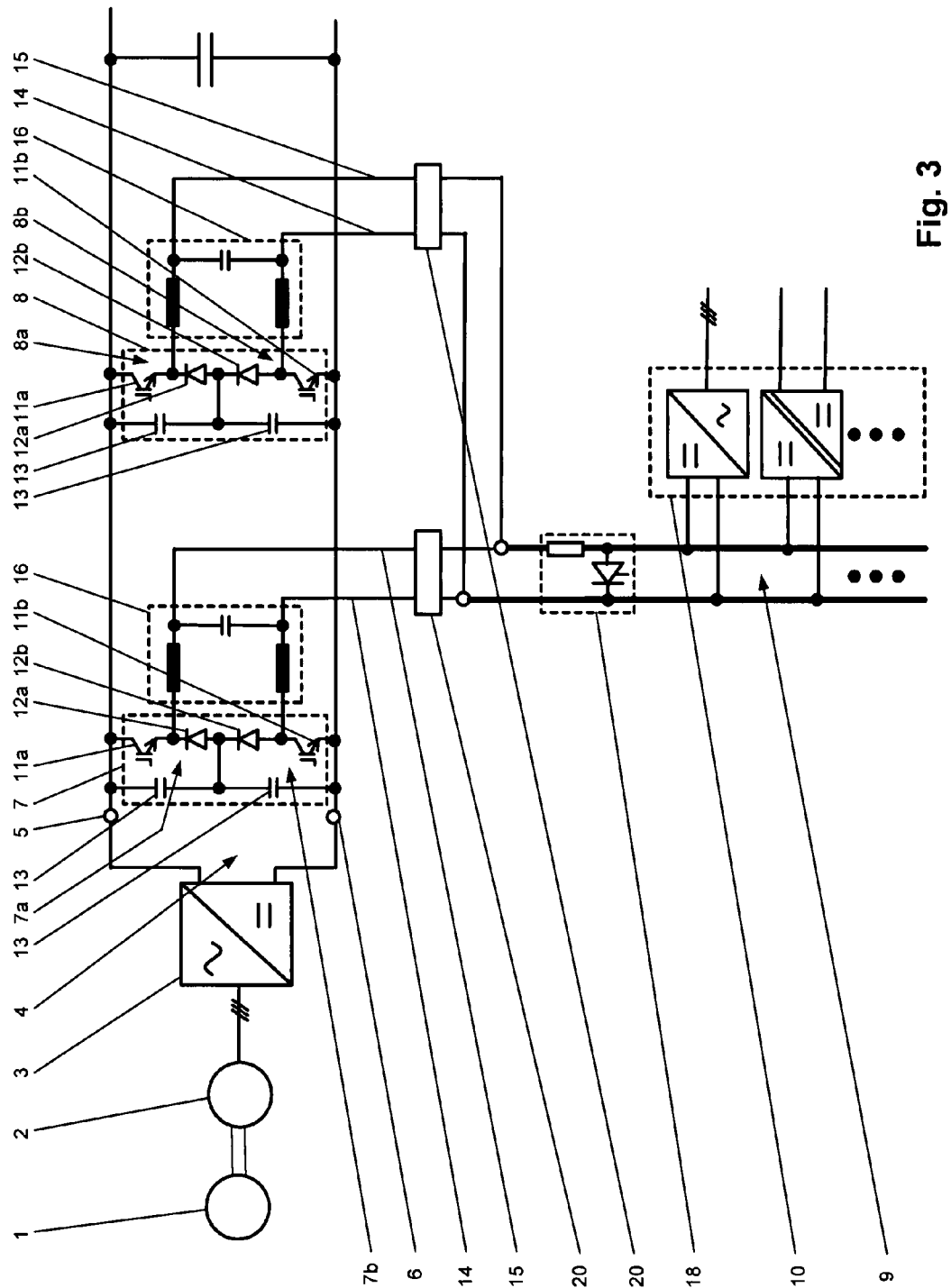

In contrast with the first and second exemplary embodiment of the device according to FIG. 1 and FIG. 2 the respective step-down converter 7, 8 in a third exemplary embodiment of the device, according to FIG. 3, can be formed through a first and a second series circuit 7a, 7b, 8a, 8b each of a controllable power semiconductor switch 11a, 11b with a diode 12a, 12b and through a capacity 13 each connected in parallel with each series circuit, wherein the diode 12a of the first series circuit 7a, 8a is connected with the diode 12b of the second series circuit 7b, 8b. According to FIG. 3 the controllable power semiconductor switch 11a, 11b is designed as a bipolar transistor with gate electrode designed in an insulated manner (IGBT). However the controllable power semiconductor switch can be configured as power MOSFET, as turn-off thyristor (GTO—Gate Turn-Off Thyristor) or as integrated thyristor with commutated gate electrode (IGCT—Integrated Gate Commutated Thyristor). According to FIG. 3 with the respective step-down converter 7, 8, the controllable power semiconductor switch 11a of the first series circuit 7a, 8a is connected with the first connection 5 of the DC voltage circuit 4 and the controllable power semiconductor switch 11b of the second series circuit 7b, 8b with the second connection 6 of the DC voltage circuit 4. In addition, with the respective step-down converter 7, 8, the connecting point of the diode 12a of the first series circuit 7a, 8a with the controllable power semiconductor switch 11a of the first series circuit 7a, 8a is connected with the common DC voltage rail system 9 through a first connection 14. In addition, with the respective step-down converter 7, 8, the connecting point of the diode 12b of the second series circuit 7b, 8b with the controllable power semiconductor switch 11b of the second series circuit 7b, 8b is connected with the common DC voltage rail system 9 through a second connection 15. Through the embodiment of the first and second step-down converter 7, 8 described above a voltage of the DC voltage circuit 4 which is higher compared with the embodiment of the first and second step-down converter 7, 8 according to FIG. 1 and FIG. 2 can be connected since this voltage is split over the two capacities 13 of the respective step-down converter 7, 8. If however a comparable voltage of the DC voltage 4 as with the embodiment of the first and second step-down converter 7, 8 according to FIG. 1 and FIG. 2 is selected, more economical low-voltage semiconductors can be used for the relevant controllable power semiconductor switches 11a, 11b and diodes 12a, 12b because of the splitting of this voltage over the two capacities 13, which can be operated with a high switching frequency. Step-down converters 7, 8 designed in this way advantageously generate less undesirable voltage fluctuations and current fluctuations and consequently cause less EMC problems. In addition, step-down converters 7, 8 designed in this way only have minimum conductance and switching losses so that the step-down converter 7, 8 can be operated particularly efficiently. The respective step-down converter 7, 8 according to FIG. 3 additionally manages to get by with a minimum quantity of components and can therefore be realized very easily and space-savingly. Through the low quantity of components the first and second step-down converters 7, 8 are particularly robust and not susceptible to faults and therefore have a high availability.

According to FIG. 3 with the respective step-down converter 7, 8 a filter circuit 16 is connected between the first connection 14 and the common DC voltage rail system 9 and between the second connection 15 and common DC voltage rail system 9. The filter circuit 16 advantageously results in that undesirable voltage fluctuations and current fluctuations created through switching actions of the respective step-down converter 7, 8 are filtered out so that the voltage of the DC voltage rail system 9, e.g., the voltage present between the rail system legs, is nearly a DC voltage.

Figure 4:
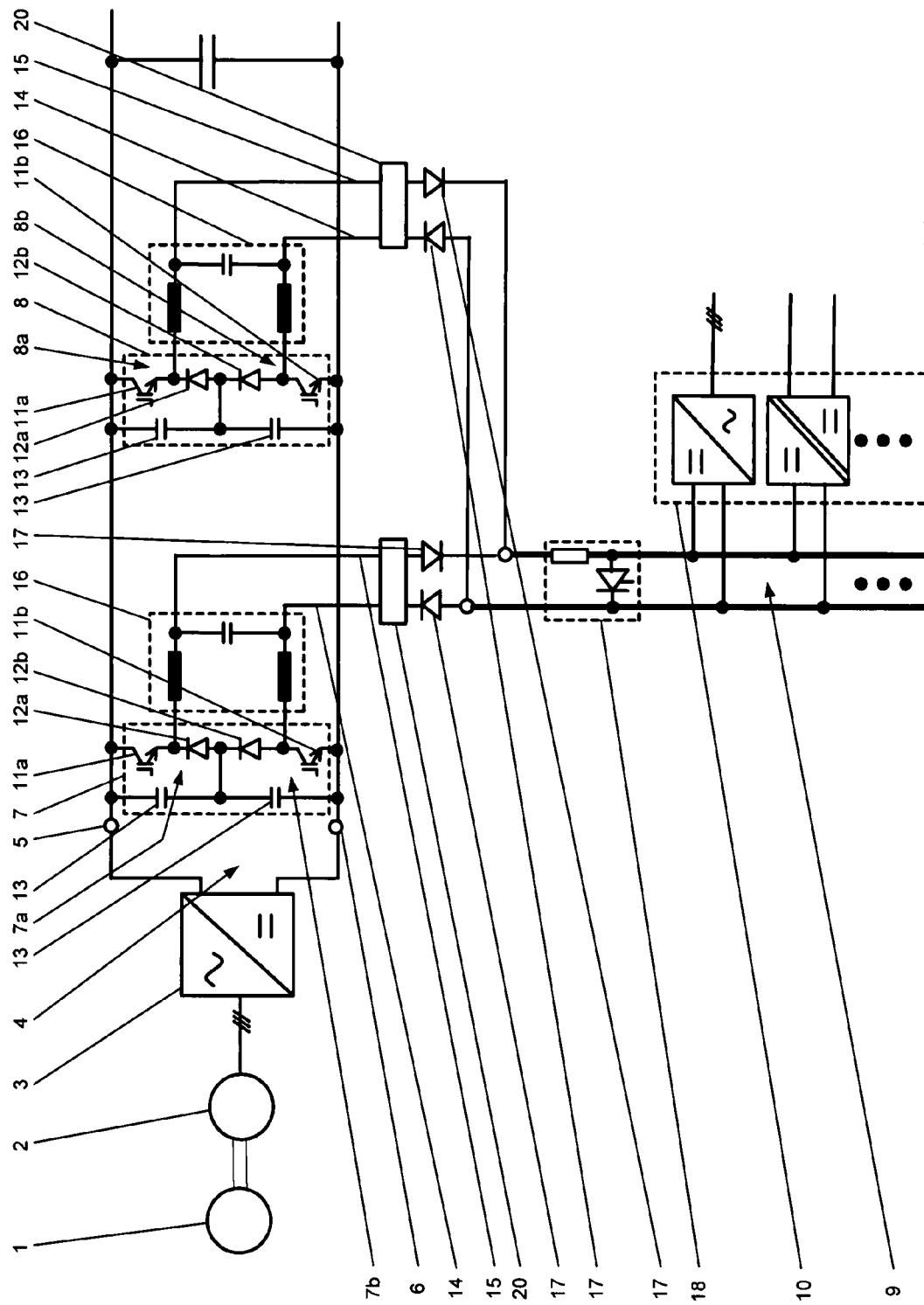

In a fourth exemplary embodiment of the device according to FIG. 4, in contrast with the third embodiment according to FIG. 3, a current direction limitation element 17 each is connected with the respective step-down converter 7, 8 in the first connection 14 and in the second connection 15. The respective current direction limitation element 17 serves to ensure that only a current in defined current direction flows from the respective step-down converter 7, 8 to the DC voltage rail system 9 and, in a defined manner, back again. As a result it is advantageously avoided that a fault current, for instance caused through a fault of the DC voltage rail system 9 and/or a fault in one or in several auxiliary operating facilities 10, can flow back to the respective step-down converter 7, 8 and damage or even destroy the respective step-down converter 7, 8. The respective current direction limitation element 17 according to FIG. 4 can be configured as a diode and therefore advantageously realized very easily and space-savingly.

Figure 5:
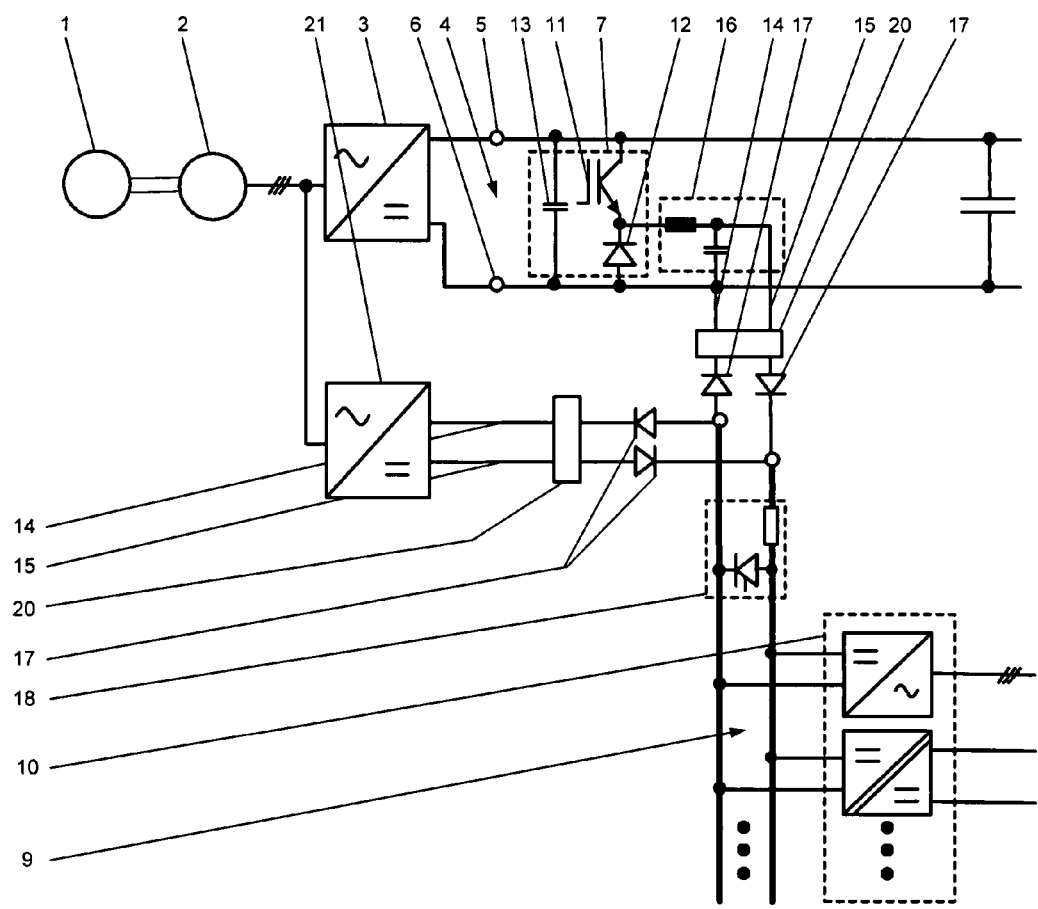
Figure 6:
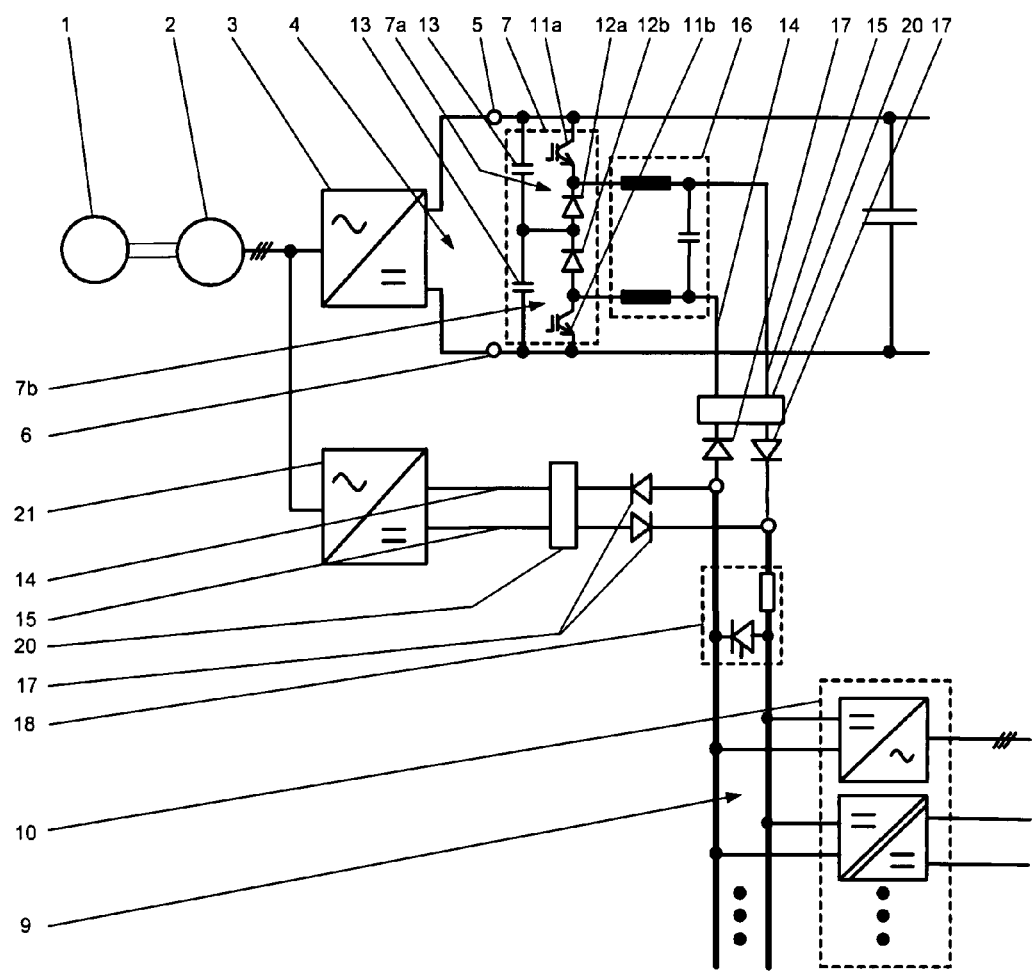

In a fifth and sixth exemplary embodiments of the device according to FIG. 5 and FIG. 6 a further rectifier 21 connected with the generator 2 on the AC voltage side is provided alternatively to the first, second, third and fourth embodiment according to FIG. 1, FIG. 2, FIG. 3 and FIG. 4 instead of the step-down converter 8, wherein the first step-down converter 7 and a further rectifier 21 connected with the generator 2 on the AC voltage side and assigned to the generator 2 is connected with a common DC voltage rail system 9 for the feeding of the auxiliary operating facilities 10 connected down-stream of the first step-down converter 7 and the further rectifier 21. According to FIG. 5 and FIG. 6 the first step-down converter 7 can be connected downstream of the DC voltage circuit 4. In addition, the first step-down converter 7 according to FIG. 5 is embodied and connected or switched according to the first step-down converter according to FIG. 1 and FIG. 2 and has the already mentioned advantages. Moreover the first step-down converter 7 according to FIG. 6 ican be configured and connected or switched according to the first step-down converter according to FIG. 3 and FIG. 4 and also has the two already mentioned advantages.

Through the first step-down converter 7 and the further rectifier 21 the voltage on the DC voltage rail system 9 can be set with advantage. This setting is performed such that the voltage on the DC voltage rail system 9 is lower than the voltage between the first and second connection 5, 6 of the DC voltage circuit 4. Through the voltage of the DC voltage rail system 9 which is lower in comparison with the DC voltage circuit 4 the insulation distance of the rail system legs of the DC voltage rail system 9 can be reduced so that advantageously space can be saved and additionally the installation and maintenance expenditure can be kept low or minimized. In addition, through the first step-down converter 7 and the further rectifier 21, both of which can be connected with the common DC voltage rail system 9, a redundant feed of the DC voltage rail system 9 is possible. This means that in the event of a fault or a failure for example of the first step-down converter 7 the feed of the DC voltage rail system 9 is performed by way of the further rectifier 21 so that the auxiliary operating facilities 10 can continue to be fed by way of their inverters and/or the DC voltage converters. As a result, the exemplary device is highly robust, not susceptible to faults and characterized by high availability.

According to FIG. 5 and FIG. 6 a current direction limitation element 17 each is connected into the first connection 14 and in the second connection 15 with the further rectifier 21 as well as with the first step-down converter 7. The respective current direction limitation element 17 serves to ensure that only a current flows in defined current direction from the first step-down converter 7 and from the further rectifier 21 to the DC voltage rail system 9 and, defined, back again. As a result, it is advantageously avoided that a fault current, for example caused through a fault of the DC voltage rail system 9 and/or a fault in one or in several auxiliary operating facilities 10, is able to flow back to the first step-down converter 7 or the further rectifier 21 and damage or even destroy the first step-down converter 7 or the further rectifier 20. The respective current direction limitation element 17 according to FIG. 5 and FIG. 6 ican be configured as a diode and can therefore be advantageously realized highly simply and space-savingly.

To isolate the faulty or failed first step-down converter 7 or the further rectifier 21 as mentioned above, an isolating element 21 is connected into the first and second connection 14, 15 both with the further rectifier 21 and the first step-down converter 7. As a result, it is advantageously ensured that the faulty or failed first step-down converter 7 or further rectifier 21 does not for example short-circuit the corresponding first and second connection 14, 15. The isolating element 20 can be embodied as low-inductive switch, for example as a mechanical or controllable power semiconductor switch, or as a fuse.

With the various exemplary embodiments of the device according to FIG. 1 to FIG. 4 the common DC voltage rail system 9 has an overvoltage limitation network 18. The overvoltage limitation network 18 is formed through a resistor and a controllable switch, e.g., a controllable power semiconductor switch, wherein the overvoltage limitation network 18 is actuated by closing the switch when an overvoltage of the voltage of the DC voltage rail system 9 occurs. Advantageously, when the switch is actuated, energy of the DC voltage rail system 9 is converted into heat in the resistor and consequently the voltage of the DC voltage rail system 9 reduced easily, quickly and effectively. The actuation of the overvoltage limitation network 18 can take place for a specified period of time. This period of time can be specified as a function of the thermal capacity of the resistor.

To isolate a faulty or failed step-down converter 7, 8 as mentioned above, an isolating element 20 is connected into the first and second connection 14, 15 with the respective step-down converter 7, 8 with the exemplary embodiments of the device according to FIG. 1 to FIG. 4. As a result, it is advantageously ensured that the faulty or failed step-down converter 7, 8 does not for example short-circuit the corresponding first and second connection 14, 15. The isolating element 20 can be embodied as a low-inductive switch, for example as a mechanical or controllable power semiconductor switch or as a fuse.

In a seventh, eighth, ninth and tenth exemplary embodiments of the device according to FIG. 7, FIG. 8, FIG. 9 and FIG. 10, alternatively to the first, second, third, fourth, fifth and sixth embodiment according to FIG. 1, FIG. 2, FIG. 3, FIG. 4, FIG. 5 and FIG. 6 instead of a single rectifier 3 connected on the AC voltage side with the generator 2, first and second rectifiers 3a, 3b assigned to the generator 2 can be connected with the generator 2 on the AC voltage side, wherein the first rectifier 3a on the DC voltage side is connected with a first and a second connection 5a, 6a of a first DC voltage circuit 4a assigned to the first rectifier 3a and connected downstream of the first rectifier 3a and the second rectifier 3b on the DC voltage side with a first and a second connection 5b, 6b of a second DC voltage circuit 4b assigned to the second rectifier 3b and connected downstream of the second rectifier 3b. A first and a second step-down converter 7, 8 is then provided, wherein the first step-down converter 7 is connected with the first and second connection 5a, 6a of the first DC voltage circuit 4a and the second step-down converter 8 with the first and second connection 5b, 6b of the second DC voltage circuit 4b. In addition, the first and second step-down converters 7, 8 is connected with a common DC voltage rail system 9 for the feeding of the auxiliary operating facilities 10 connected downstream of the first and second step-down converter 7,8. According to FIG. 7 to FIG. 10 the first step-down converter 7 can be connected down-stream of the first DC voltage circuit 4a and the second step-down converter 8 can be connected downstream of the second DC voltage circuit 4b. According to FIG. 7, FIG. 8, FIG. 9 and FIG. 10 the common DC voltage rail system 9 has two of the rail system legs. According to FIG. 7, FIG. 8, FIG. 9 and FIG. 10 inverters of the auxiliary operating facilities 10 and/or DC voltage converters of the auxiliary operating facilities 10 can be connected to the common DC voltage rail system 9 for their feeding.

Through the two step-down converters 7, 8 according to FIG. 7, FIG. 8, FIG. 9 and FIG. 10 the voltage on the DC voltage rail system 9 can be set with advantage. This setting is performed such that the voltage on the DC voltage rail system 9 is lower than the voltage between the first and second connection 5a, 5b, 6a, 6b of the respective DC voltage circuit 4a, 4b. Through the voltage of the DC voltage rail system 9 which is lower in comparison with the respective DC voltage circuit 4a, 4b the insulation distance of the rail system legs of the DC voltage rail system 9 can be reduced so that advantageously space can be saved and the installation and maintenance expenditure additionally kept low or minimized. Furthermore, through the two step-down converters 7, 8 connected with the common DC voltage rail system 9 a redundant feed of the DC voltage rail system 9 is possible. This means that in the event of a fault or a failure for example of the first step-down converter 7 the feed of the DC voltage rail system 9 is performed by way of the second step-down converter 8 so that the auxiliary operating facilities 10 can continue to be fed by way of their inverters and/or DC voltage converters. As a result, the exemplary device is highly robust, not susceptible to faults and characterized by high availability.

According to FIG. 7, FIG. 8, FIG. 9 and FIG. 10 the respective step-down converter 7, 8 is formed through a series circuit of a controllable power semiconductor switch 11 with a diode 12 and through a capacity 13 connected parallel to the series circuit of the controllable power semiconductor switch 11 with the diode 12. According to FIG. 7, FIG. 8, FIG. 9 and FIG. 10 the controllable power semiconductor switch 11 is designed as a bipolar transistor with gate electrode arranged in an insulated manner (IGBT). However, the controllable power semiconductor switch can be configured as power MOSFET, as turn-off thyristor (GTO—Gate Turn-Off Thyristor) or as integrated thyristor with commutated gate electrode (IGCT—Integrated Gate Commutated Thyristor). According to FIG. 7, FIG. 8, FIG. 9 and FIG. 10 the controllable power semiconductor switch 11 with the respective stepdown converter 7, 8 can be additionally connected with the first connection 5a, 5b of the corresponding DC voltage circuit 4a, 4b and the diode 12 with the second connection 6a, 6b of the corresponding DC voltage circuit 4a, 4b. In addition to this, with the respective step-down converter 7, 8, the diode 12 is connected with the common DC voltage rail system 9 through a first connection 14 and the connecting point of the diode 12 with the controllable power semiconductor switch 11 through a second connection 15. The respective step-down converter 7, 8 consequently manages with a minimum quantity of components and can therefore be realized very easily and space-savingly. Through the low quantity of components the first and second step-down converter 7, 8 are particularly robust and not susceptible to faults and consequently have a high availability.

According to FIG. 7, FIG. 8, FIG. 9 and FIG. 10 with the respective step-down converter 7, 8 a filter circuit 16 is additionally connected between the first connection 14 and the common DC voltage rail system 9 and to the second connection 15. The filter circuit 16 advantageously results in that undesirable voltage fluctuations and current fluctuations created through switching actions of the respective step-down converter 7, 8 are filtered out so that the voltage of the DC voltage rail system 9, e.g., the voltage present between the rail system legs, is nearly a DC voltage.

Figure 7:
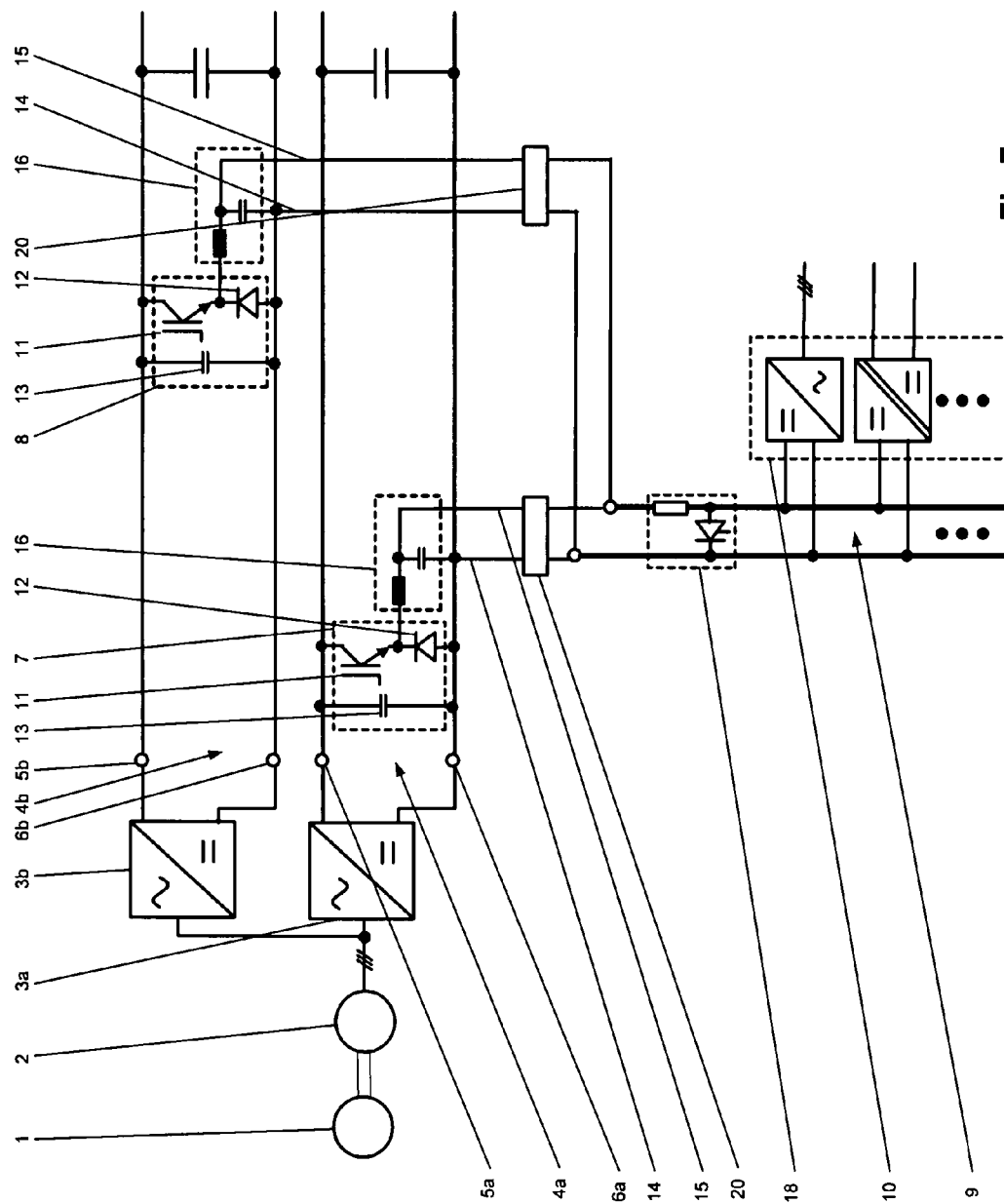
Figure 8:
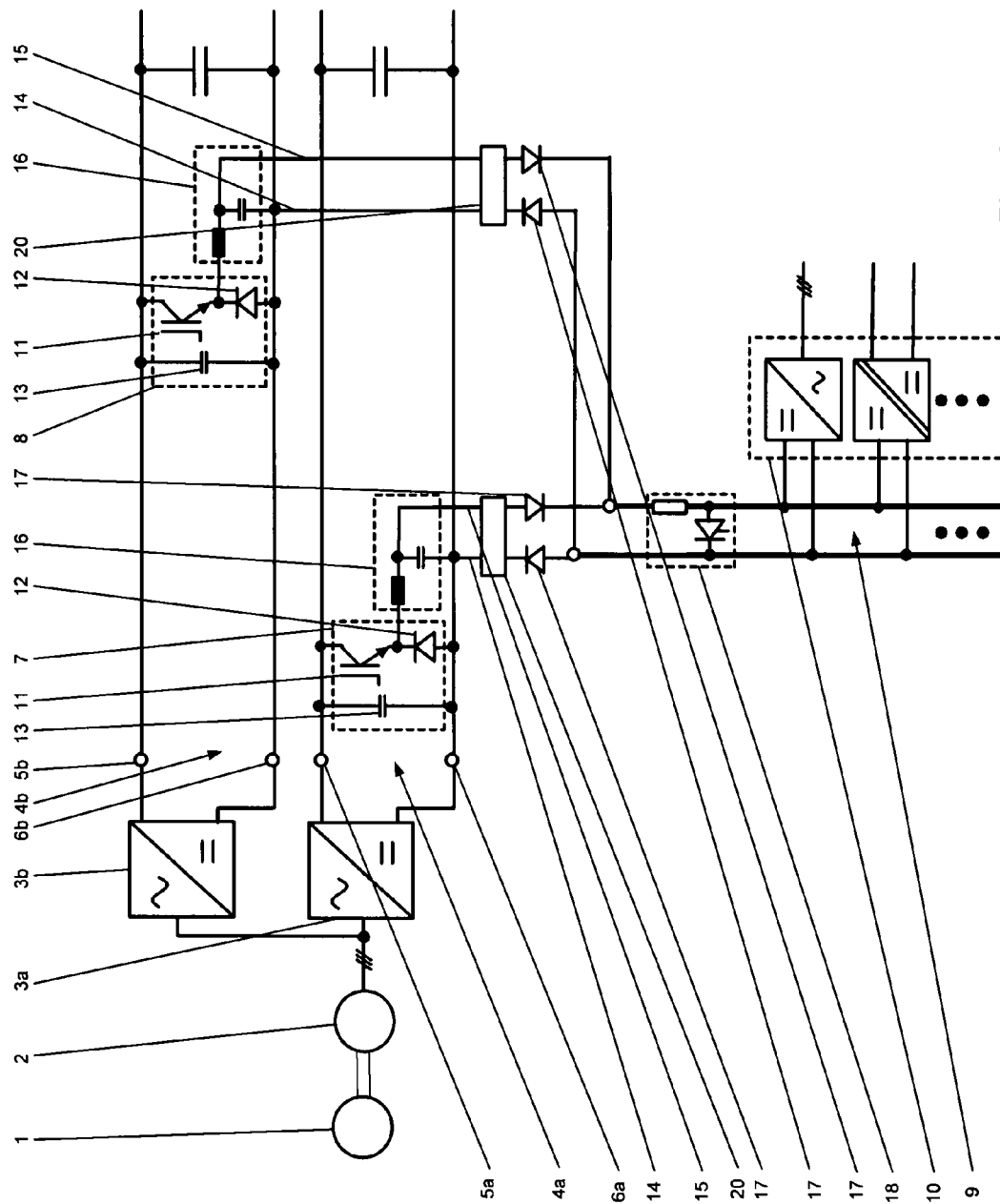

In the eighth exemplary embodiment of the device according to FIG. 8, in contrast with the seventh exemplary embodiment according to FIG. 7, with the respective step-down converter 7,8, a current direction limitation element 17 each can be connected to the first connection 14 and to the second connection 15. The respective current direction limitation element 17 serves to ensure that only a current in defined current direction flows from the respective step-down converter 7, 8 to the DC voltage rail system 9 and, in a defined manner, back again. As a result, it is advantageously avoided that a fault current, for example caused through faults of the DC voltage rail system 9 and/or a fault in one or in several auxiliary operating facilities 10, can flow back to the respective step-down converter 7, 8 and damage or even destroy the respective step-down converter 7, 8. The respective current direction limitation element 17 according to FIG. 8 can be configured as a diode and consequently can be realized very easily and space-savingly.

Figure 9:
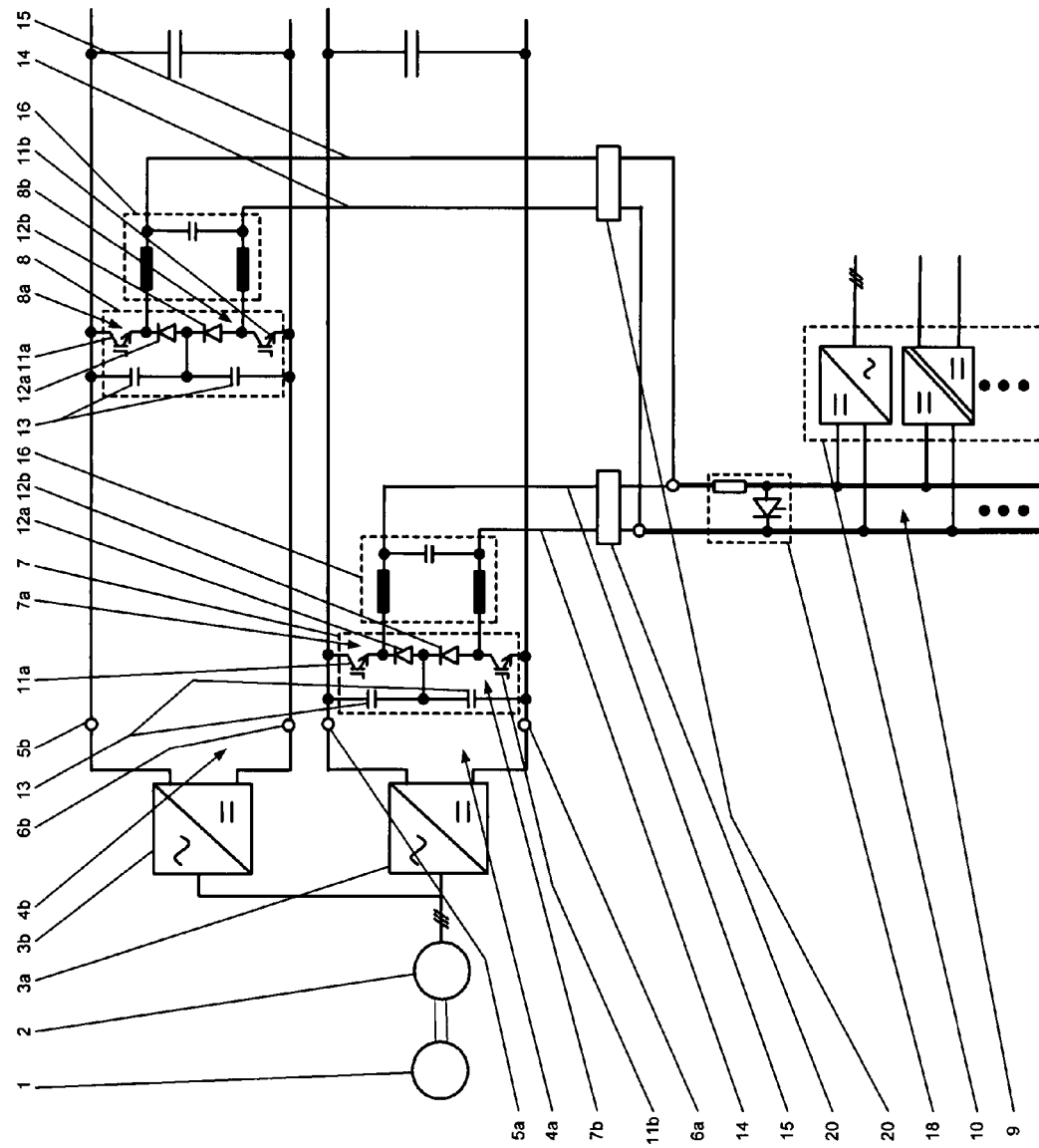

In the ninth exemplary embodiment of the device according to FIG. 9 in contrast with the seventh and eighth embodiment according to FIG. 7 and FIG. 8 the respective step-down converter 7, 8 is formed through a first and a second series circuit 7a, 7b, 8a, 8b each of a controllable power semiconductor switch 11a, 11b with a diode 12a, 12b and through a capacity 13 each connected in parallel with each series circuit, wherein the diode 12a of the first series circuit 7a, 8a is connected with a diode 12b of the second series circuit 7b, 8b. According to FIG. 9 the controllable power semiconductor switch 11a, 11b is designed as a bipolar transistor with gate electrode arranged in an insulated manner (IGBT). However the controllable power semi-conductor switch can be configured as power MOSFET, as turn-off thyristor (GTO—Gate Turn-Off Thyristor) or as integrated thyristor with commutated gate electrode (IGCT—Integrated Gate Commutated Thyristor). According to FIG. 9 with the respective step-down converter 7, 8, the controllable power semi-conductor switch 11a of the first series circuit 7a, 8a is connected with the first connection 5a, 5b of the corresponding DC voltage circuit 4a, 4b and the controllable power semiconductor switch 11b of the second series circuit 7b, 8b with the second connection 6a, 6b of the DC voltage circuit 4a, 4b. Furthermore, with the respective step-down converter 7, 8, the connecting point of the diode 12a of the first series circuit 7a, 8b with the controllable power semiconductor switch 11a of the first series circuit 7a, 8a is connected with the common DC voltage rail system 9 through a first connection 14. In addition, with the respective step-down converter 7, 8 the connecting point of the diode 12b of the second series circuit 7b, 8b with the controllable power semiconductor switch 11b of the second series circuit 7b, 8b is connected with the common DC voltage rail system 9 through a second connection 15. Through the embodiment of the first and second step-down converter 7, 8 described above a higher voltage of the respective DC voltage 4a, 4b in comparison with the embodiment of the first and second step-down converter 7, 8 according to FIG. 7 and FIG. 8 can be connected since this voltage is split over the two capacities 13 of the respective step-down converters 7, 8. If however a comparable voltage of the respective DC voltage circuit 4a, 4b as with the embodiment of the first and second step-down converter 7, 8 according to FIG. 7 and FIG. 8 is selected, because of the division of this voltage over the two capacities 13 of the respective step-down converter 7, 8, economical low voltage semiconductors can be used for the corresponding controllable semiconductor switches 11a, 11b and diodes 12a, 12b, which can be operated with a high switching frequency. Step-down converters 7, 8 designed such advantageously generate less undesirable voltage fluctuations and current fluctuations and consequently cause less EMC problems. In addition, step-down converters 7, 8 designed thus only have minimum conductance and switching losses so that the step-down converters 7, 8 can be operated particularly efficiently. The respective step-down converter 7, 8 according to FIG. 9 additionally manages with a minimum quantity of components and can consequently be realized very easily and space-savingly. Through the low quantity of components the first and second step-down converter 7, 8 is particularly robust and not susceptible to faults and thus has a high availability.

According to FIG. 9 a filter circuit 16 is connected with the respective step-down converter 7, 8 between the first connection 14 and the common DC voltage rail system 9 and between the second connection 15 and the common DC voltage rail system 9. The filter circuit 16 advantageously results in that undesirable voltage fluctuations and current fluctuations created through switching actions of the respective step-down converter 7, 8 are filtered out so that the voltage of the DC voltage rail system 9, e.g., the voltage present between the rail system legs, is nearly a DC voltage.

Figure 10:
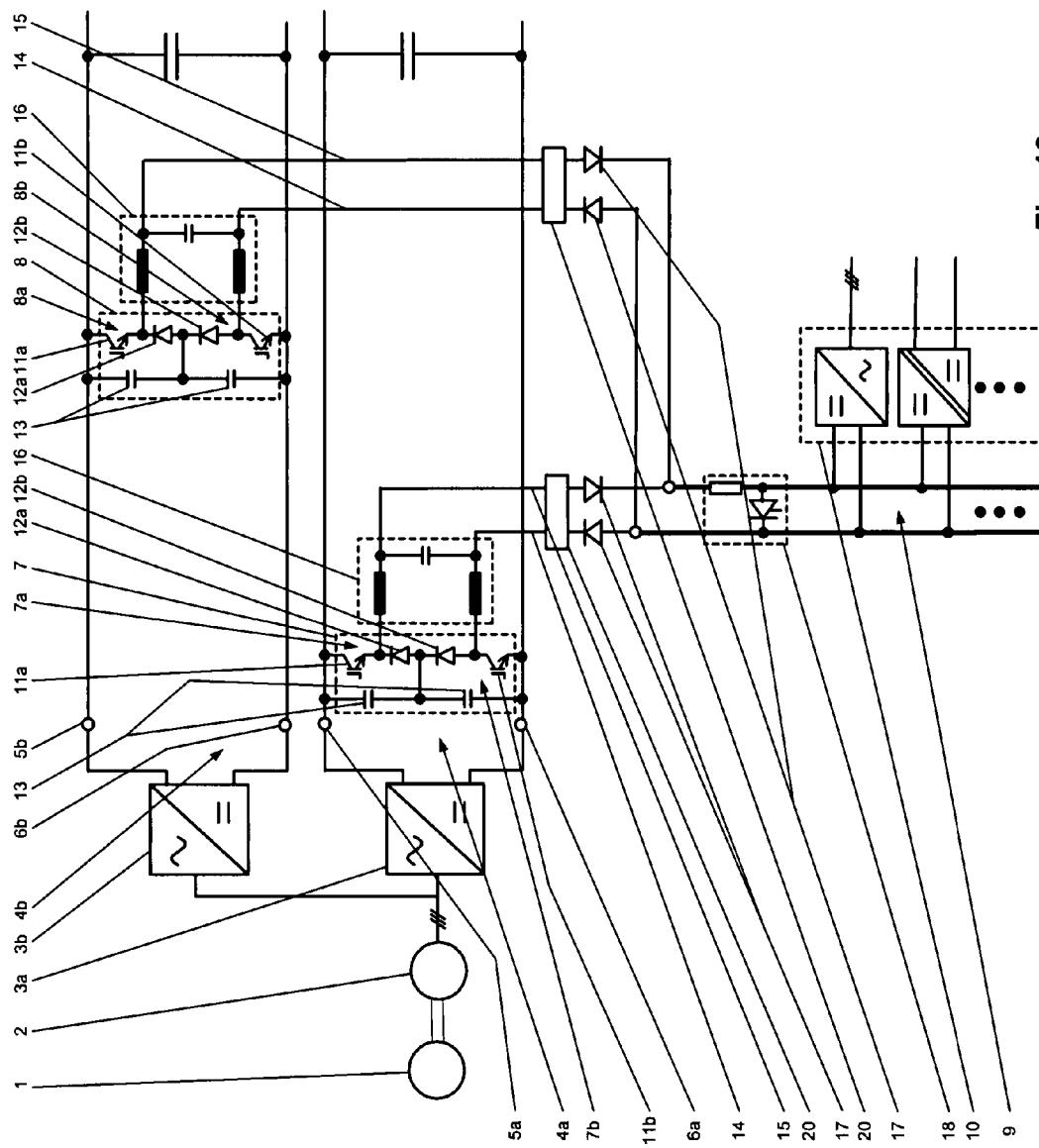

In the tenth exemplary embodiment of the device according to FIG. 10, in contrast with the ninth exemplary embodiment according to FIG. 9, with the respective step-down converter 7, 8, a current direction limitation element 17 each is connected to the first connection 14 and into the second connection 15. The respective current direction limitation element 17 serves to ensure that only a current in defined current direction flows from the respective step-down converter 7, 8 to the DC voltage rail system 9 and, defined, back again. As a result it is advantageously avoided that a fault current for example caused through a fault of the DC voltage rail system 9 and/or a fault in one or in several auxiliary operating facilities 10 can flow back to the respective step-down converter 7, 8 and damage or even destroy the respective step-down converter 7, 8. The respective current direction limitation element 17 according to FIG. 10 can be configured as a diode and can thus be realized advantageously very easily and space-savingly.

With the various exemplary embodiments of the device exemplified in FIG. 7, FIG. 8, FIG. 9 and FIG. 10 the common DC voltage rail system 9 can have an overvoltage limitation network 18. The overvoltage limitation network 18 is formed through a resistor and a controllable switch, e.g., a controllable power semiconductor switch, wherein the overvoltage limitation network 18 is actuated through closing of the switch in the event that an overvoltage of the voltage of the DC voltage rail system 9 should occur. Advantageously energy of the DC voltage rail system 9 is converted into heat in the resistor when the switch is actuated and the voltage of the DC voltage rail system 9 consequently reduced easily, quickly and effectively. The actuation of the overvoltage limitation network 18 can be carried out for a specified period of time. This period of time can be specified as a function of the thermal capacity of the resistor. Actuation is performed according to criteria known to the expert which will not be discussed in more detail at this point.

To isolate a faulty or failed step-down converter 7, 8 as mentioned above an isolating element 20 is connected to the first and second connection 14, 15 with the respective step-down converter 7, 8 in the various exemplary embodiments of the device according to FIG. 7, FIG. 8, FIG. 9 and FIG. 10. As a result, it is advantageously ensured that the faulty or failed step-down converter 7, 8 does not for example short-circuit the corresponding first and second connection 14, 15. The isolating element 20 can be embodied as low-inductive switch, for example as a mechanical or as controllable power semiconductor switch, or as a fuse.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMBERS

1 Combustion engine
2 Generator
3 Rectifier
3a First rectifier
3b Second rectifier
4 DC voltage circuit
4a First DC voltage circuit
4b Second DC voltage circuit
5 First connection of the DC voltage circuit
5a First connection of the first DC voltage circuit
5b First connection of the second DC voltage circuit
6 Second connection of the DC voltage circuit
6a Second connection of the first DC voltage circuit
6b Second connection of the second DC voltage circuit
7 First step-down converter
7a First series circuit of the first step-down converter
7b Second series circuit of the first step-down converter
8 Second step-down converter 8a First series circuit of the second step-down converter
8b Second series circuit of the second step-down converter
9 DC voltage rail system
10 Auxiliary operating facilities
11 Controllable power semiconductor switch
11a Controllable power semiconductor switch of the first series circuit of the first and second step-down converter
11b Controllable power semiconductor switch of the second series circuit of the first and second step-down converter
12 Diode
12a Diode of the first series circuit of the first and second step-down converter
12b Diode of the second series circuit of the first and second step-down converter
13 Capacity
14 First connection
15 Second connection
16 Filter circuit
17 Current direction limitation element
18 Overvoltage limitation network
19 Capacity of the first voltage increase limitation network
20 Isolating element
21 Further rectifier

The invention claimed is:

1. A device for the feeding of auxiliary operating facilities for a fuel-electrically driven vehicle with a combustion engine, with a generator driven by the combustion engine, with a rectifier connected with the generator on the AC voltage side and assigned to the generator, wherein the rectifier on the DC voltage side is connected with a first and a second connection of a DC voltage circuit assigned to the rectifier and connected downstream of the rectifier, wherein, a first and a second step-down converter each being connected with the first and second connections of the DC voltage circuit, and wherein respective stepped-down outputs of the first and second step-down converters are connected in common with a common DC voltage rail system for the feeding of the auxiliary operating facilities connected to the common DC voltage rail system downstream of the first and second step-down converters.

2. The device according to claim 1, wherein the respective step-down converter is formed through a series circuit of a controllable power semiconductor switch with a diode and through a capacity switched parallel to the series circuit of the controllable power semiconductor switch with the diode.

3. The device according to claim 2, wherein with the respective step-down converter the controllable power semiconductor switch is connected with the first connection of the DC voltage circuit and the diode with the second connection of the DC voltage circuit, and wherein with the respective step-down converter the diode is connected with the common DC voltage rail system through a first connection and the connecting point of the diode with the controllable power semiconductor switch through a second connection.

4. The device according to claim 3, wherein with the respective step-down converter a filter circuit is connection between the first connection and the common DC voltage rail system and to the second connection.

5. The device according to claim 3, wherein with the respective step-down converter a current direction limitation element each is connected to the first connection and into the second connection.

6. The device according to claim 3, wherein with the respective step-down converter an isolating element is connected to the first and second connections.

7. The device according to claim 1, wherein the respective step-down converter is formed through a first and a second series circuit each of a controllable power semiconductor switch with a diode and through a capacity each connected parallel to each series circuit, wherein the diode of the first series circuit is connected with the diode of the second series circuit.

8. The device according to claim 7, wherein with the respective step-down converter the controllable power semiconductor switch of the first series circuit is connected with the first connection of the DC voltage circuit and the controllable power semi-conductor switch of the second series circuit with the second connection of the DC voltage circuit, that with the respective step-down converter the connecting point of the diode of the first series circuit with the controllable power semiconductor switch of the first series circuit is connected with the DC common rail system through a first connection, and wherein with the respective step-down converter the connecting point of the diode of the second series circuit with the controllable power semiconductor switch of the second series circuit is connected with the common DC voltage rail system through a second connection.

9. The device according claim 8, wherein with the respective step-down converter a filter circuit is connected between the first connection and the common DC voltage rail system and between the second connection and the common DC voltage rail system.

10. The device according to claim 1, wherein the common DC voltage rail system has an overvoltage limitation network.

11. The device according to claim 1, wherein the generator is a single generator, the rectifier is a single rectifier, and the DC voltage circuit is a single DC voltage circuit.

12. The device according to claim 1, wherein the generator is a single generator.

13. A device for the feeding of auxiliary operating facilities for a fuel-electrically driven vehicle with a combustion engine, with a generator driven by the combustion engine, with a rectifier connected with the generator on the AC voltage side and assigned to the generator, wherein the rectifier on the DC voltage side is connected with a first and a second connection of a DC voltage circuit assigned to the rectifier and connected downstream of the rectifier, wherein, a first step-down converter is connected with the first and second connections of the DC voltage circuit, and wherein the first step-down converter and a further rectifier connected with the generator on the AC voltage side and assigned to the generator is connected with a common DC voltage rail system for the feeding of the auxiliary operating facilities connected to the common DC voltage rail system downstream of the first step-down converter and the further rectifier.

14. The device according to claim 13, wherein the further rectifier is connected with the common DC voltage rail system through a first connection and through a second connection.

15. The device according to claim 14, wherein with the further rectifier a current direction limitation element each is switched into the first connection and into the second connection.

16. The device according to claim 14, wherein with the further rectifier an isolating element is switched into the first and second connections.

17. The device according to claim 13, wherein the respective step-down converter is formed through a series circuit of a controllable power semiconductor switch with a diode and through a capacity switched parallel to the series circuit of the controllable power semiconductor switch with the diode.

18. The device according to claim 13, wherein the common DC voltage rail system has an overvoltage limitation network.

19. A device for the feeding of auxiliary operating facilities for a fuel-electrically driven vehicle with a combustion engine, with a generator driven by the combustion engine, with first and second rectifiers connected with the generator on the AC voltage side and assigned to the generator, wherein the first rectifier on the DC voltage side is connected with a first and a second connection of a first DC voltage circuit assigned to the first rectifier and connected downstream of the first rectifier and the second rectifier on the DC voltage side with a first and a second connection of a second DC voltage circuit assigned to the second rectifier and connected downstream of the second rectifier, wherein, a first step-down converter is connected with the first and second connections of the first DC voltage circuit and a second step-down converter is connected with the first and second connections of the second DC voltage circuit, and wherein respective stepped-down outputs of the first and second step-down converters are connected in common with a common DC voltage rail system for the feeding of the auxiliary operating facilities connected to the common DC voltage rail system downstream of the first and second step-down converters.

20. The device according to claim 19, wherein the respective step-down converter is formed through a series circuit of a controllable power semiconductor switch with a diode and through a capacity switched parallel with the series circuit of the controllable power semiconductor switch with the diode.

21. The device according to claim 20, wherein with the respective step-down converter the controllable power semiconductor switch is connected with the first connection of the corresponding DC voltage circuit and the diode with the second connection of the corresponding DC voltage circuit, and wherein with the respective step-down converter the diode is connected with the common DC voltage rail system through a first connection and the connecting point of the diode with the controllable power semiconductor switch through a second connection.

22. The device according to claim 21, wherein with the respective step-down converter a filter circuit is connected between the first connection and the common DC voltage rail system and to the second connection.

23. The device according to claim 21, wherein with the respective step-down converter a current direction limitation element each is connected to the first connection and into the second connection.

24. The device according to claim 21, wherein with the respective step-down converter an isolating element is connected to the first and second connections.

25. The device according to claim 19, wherein the respective step-down converter is formed through a first and a second series circuit each of a controllable power semiconductor switch with a diode and through a capacity each connected in parallel with each series circuit, wherein the diode of the first series circuit is connected with the diode of the second series circuit.

26. The device according to claim 25, wherein with the respective step-down converter the controllable power semiconductor switch of the first series circuit is connected with the first connection of the corresponding DC voltage circuit and the controllable power semiconductor switch of the second series circuit with the second connection of the corresponding DC voltage circuit, wherein with the respective step-down converter the connecting point of the diode of the first series circuit with the controllable power semiconductor switch of the first series circuit is connected with the common DC voltage rail system through a first connection, and wherein with the respective step-down converter the connecting point of the diode of the second series circuit with the controllable power semiconductor switch of the second series circuit is connected with the common DC voltage rail system through a second connection.

27. The device according to claim 26, wherein with the respective step-down converter a filter circuit is connected between the first connection and the common DC voltage rail system and between the second connection and the common DC voltage rail system.

28. The device according to claim 19, wherein the common DC voltage rail system has an overvoltage limitation network.

\* \* \* \* \*